Jan. 5, 1960   J. H. HELLER   2,920,206
METHOD AND APPARATUS FOR CONTINUOUS MEASUREMENT OF MOISTURE
Filed Aug. 31, 1954   2 Sheets-Sheet 1
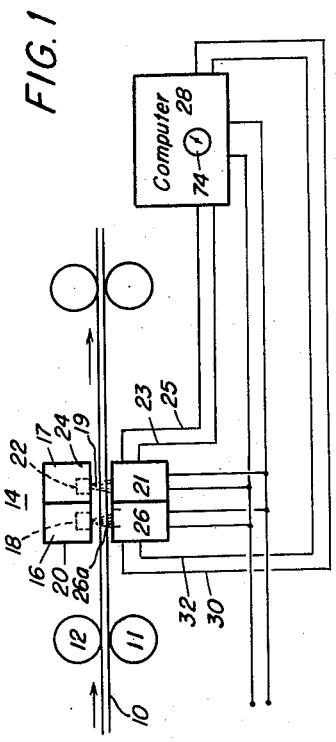
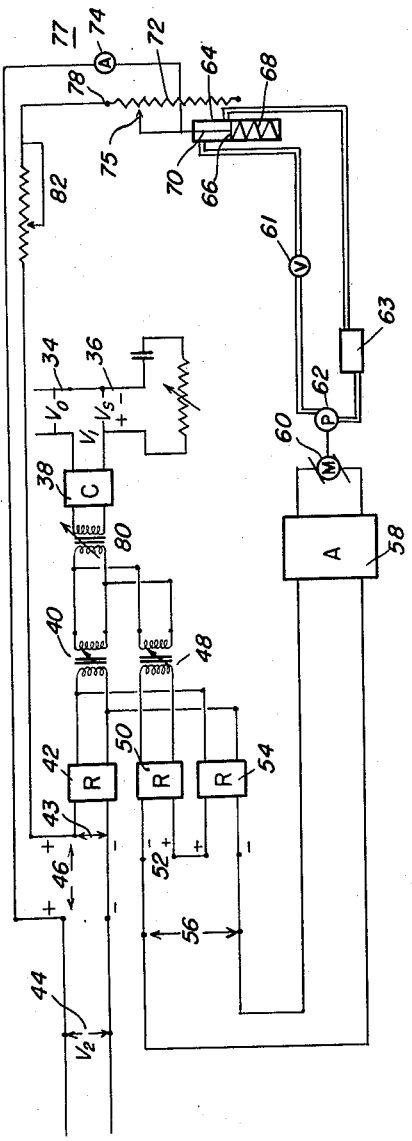
Inventor
John Herbert Heller
By his attorneys
Howson and Howson.

Jan. 5, 1960    J. H. HELLER    2,920,206
METHOD AND APPARATUS FOR CONTINUOUS MEASUREMENT OF MOISTURE
Filed Aug. 31, 1954    2 Sheets-Sheet 2

Inventor
John Herbert Heller
By his attorneys
Howson and Howson

United States Patent Office 2,920,206
Patented Jan. 5, 1960

2,920,206

METHOD AND APPARATUS FOR CONTINUOUS MEASUREMENT OF MOISTURE

John Herbert Heller, Wilton, Conn.

Application August 31, 1954, Serial No. 453,276

12 Claims. (Cl. 250—83.6)

This invention pertains to a method and apparatus for continuously measuring the moisture content of materials.

In the production of various types of materials, it is desirable to know the moisture content of the product. This may be determined by classic analytical methods, but if the material is produced at a high rate, such methods are too slow. It is highly desirable to provide means whereby the water content of the material can be measured continuously.

Methods and apparatus have been proposed for measuring the density or thickness of a continuous web by measuring the absorption of ionizing radiation by the web. In such apparatus, a beam of electrons, for example, of known density is directed at one side of the web and the number of electrons reaching the other side is measured. The decrease in density or attenuation of the beam may be taken as a measure of the mass per unit area of the material.

Such instruments are sensitive to changes in mass per unit area caused by variations in either the thickness or the density of the web.

If there are no variations in thickness and density from factors other than change in moisture content, devices of this class can be used alone to measure moisture content. They cannot be used alone, of course, where changes in density may be due to factors other than water content (e.g., packing). Moreover, because such instruments indicate only the mass per unit area of material and make no distinction between change in thickness and change in density, they cannot be used by themselves to measure moisture content where there is a substantial variation in the thickness of the web of material to be measured. In practice, such variations often occur.

For example, in the production of a continuous sheet of cellulose pulp, the sheet may vary in thickness by as much as 10%. In cases of this type, attenuation of radiation alone therefore is not a good measure of moisture content.

According to the invention, these difficulties are overcome by providing means for the simultaneous measurement of the mass and hydrogen content per unit area of the material.

According to the invention, the mass per unit area is measured by any convenient means, such for example, as by measuring the attenuation of a beam of electrons passing through the material. The hydrogen content is measured, on the other hand, by exposing the material to a beam of fast neutrons and measuring the quantity of recoil protons produced by the collision of the neutrons with hydrogen atoms. These two elements of information, namely, the attenuation of the radiation, and the number of recoil protons produced, are then furnished to a suitable calculating device where water content is calculated and continuously reported.

Many different varieties of materials may be measured for moisture content with the present invention, including materials containing bound hydrogen in definite proportions. Where the dry material contains hydrogen, however, the hydrogen should be present in fixed proportions to the rest of the dry material. If suitable computers are available this proportion may vary somewhat, but only within the ability of the computer to handle trial and error calculations.

The method is particularly valuable in connection with cellulosic materials such as pulp and paper. It may also be employed, for example, in the production of tobacco products, where the dry product can be held to an empirically derived formula. The invention may also be used with metal powders of various types, sand, silica gel, alumina, diatomaceous earth, liquids such as lubricating oils, and organic solvents, as well as gaseous materials such as fuel gas.

The accuracy of the method in any particular case, will vary with the closeness to which the composition of the material measured can be held to a predetermined standard. For example, in the production of paper, if the paper consists entirely of cellulose $(C_6H_{10}O_5) \cdot x$ (having a specific gravity of about 0.3) and water, a 1% difference in water content can be continuously determined in sheet .003" thick. If impurities other than cellulose are introduced in varying quantities, the accuracy of the determination falls off. However, in most cases, while impurities will be present, they will be present in definite proportions to the principal ingredient and hence can be taken account of in the computations.

The measurement of mass per unit area may be made in a variety of ways. Preferably, it is made in the manner described above, by measuring the attenuation of a beam of electrons passing through the material. The source of electrons may be an accelerator of any of a number of types, such for example as a Van de Graaff generator, or a linear accelerator of the Schultz type (see Review of Scientific Instruments 22, pp. 383–388). Preferably, however, it is a beta-emitting radio-isotope, such for example as strontium 90 or its decay product yttrium with its 2.18 mev. $\beta$ particles.

In general, isotopes are preferred as a source of electrons over an accelerator for reasons of convenience and cost. However, where particularly dense or thick materials are to be measured, higher velocities are required than may conveniently be obtained from isotopes and accelerators become the source of choice. Among accelerators the Schultz linear accelerator is preferred.

It is preferred to use an electron stream in preference to other ionizing radiation because a stream of this nature is easily detected and controlled, and shielding problems are minimized. However, other types of radiation can be employed, such for example as $\alpha$ particles, or $\gamma$ or $x$ radiation, in exceptional cases.

Sources for these other types of radiation may be accelerators of the types described, or radioactive materials such for example as thorium or radium.

The quantity of radio-isotope used to measure density will vary with the material measured, but should in general be sufficient to give a total activity of between about 50 millicuries and about 200 millicuries per sq. cm. of material irradiated per second.

The energy of the radiation will depend on the thickness of the material to be treated and on the type of radiation used. It must be such that a substantial quantity of radiation penetrates through the bombarded material under all foreseeable circumstances. For electrons, the energy will in general, range from about 2 to about 3 mev.

The particular radiac instrument used to measure the quantity of radiation passing through the material will vary with the type of radiation used. Where electron radiation is employed, it will generally be detected by a conventional Geiger-Muller counter or preferably by a scintillation counter.

It is not essential to the invention that the weight per unit area of material be measured by radiation attenuation. For example, conductometric measurements may be used, either alone or combined with mechanical thickness gauges.

The hydrogen content of the material is measured, in accordance with the invention, by measuring the recoil protons generated by collision between the hydrogen atoms present and fast neutrons, i.e., neutrons having an energy in excess of 3 mev.

The source of neutrons may be any of a number of radio-isotopes, such for example as polonium with beryllium, or radium with beryllium, the radium or polonium radiation causing the beryllium to emit fast neutrons. Of these, radium with beryllium is preferred. The emitted neutrons should have an energy between about 3 and about 11 mev., preferably between about 3 and about 10 mev.

The quantity of neutron source material employed will vary with the type of material measured, but in general, it should be sufficient to give a total activity of between about 1 millicurie and about 1,000 millicuries per cm.$^2$ of material irradiated per second.

Recoil protons emanating from the neutron-bombarded material may be measured in any convenient radiac device, preferably a scintillation counter.

Information from the radiac devices is sent to a suitable calculating machine, in which the percent moisture is readily calculated. The computation involved is relatively simple.

For example, taking a basis of 1 cm.$^2$ of material, assume that the total mass is $k_1$ grams and the hydrogen content is $k_2$ grams. Assume further that $x$ = fraction by weight water in the material
$k_3$ = fraction by weight H in the dry material (e.g., for cellulose = $(C^6H^{10}O^5)x$ $k^3 = \frac{10}{162}$)

then:

$$\frac{k_1 x}{9} + k_1 k_3 (1-x) = k_2$$

(1)
$$x = \frac{k_2 - k_1 k_3}{\frac{k_1}{9} - k_1 k_3}$$

$$= \frac{k_2 - k^1 k_3}{k_1(1/9 - k_3)}$$

$$= \frac{k_2}{(1/9 - k_3)k_1} - \frac{k_3}{1/9 - k_3}$$

let $$a = \frac{1}{1/9 - k_3}$$

$$b = \frac{k_3}{1/9 - k_3}$$

then:

(2)
$$x = \frac{ak_2 - b}{k_1}$$

Equations of this type are readily solved by simple computing machines, operating on either mechanical or electrical principles.

The invention will be further described in connection with the drawing in which

Figure 1 is a schematic diagram of a system for measuring the moisture content of a continuous web in accordance with the invention.

Fig. 2 is a schematic diagram of one form of computing machine for use with the present invention.

Figure 3:
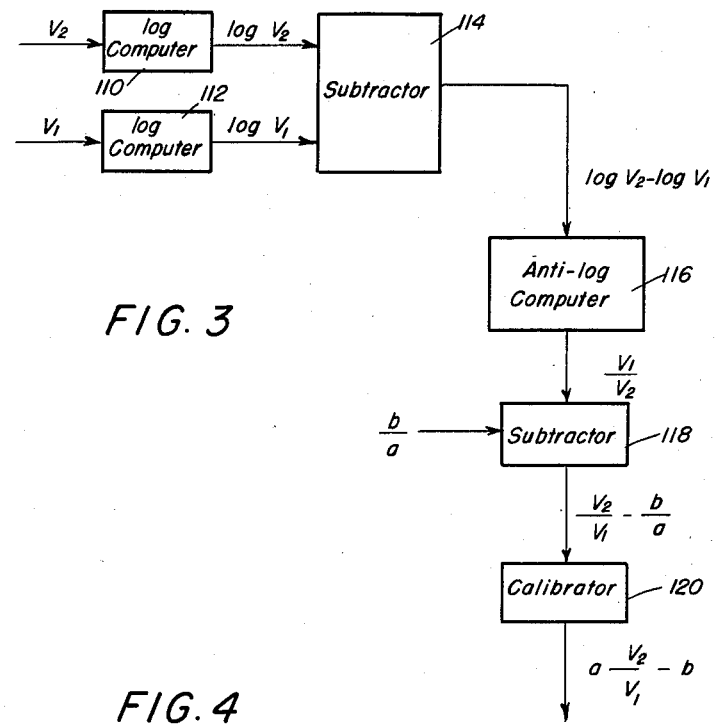
Fig. 3 is a block diagram of a second and preferred form of computing machine for use with the present invention.

The invention is described below in connection with the manufacture of paper for the purposes of illustration only, it being understood that the invention is in no way limited to such employment.

Referring first to Fig. 1, a web of paper 10, from a conventional paper-making machine is carried forward by means of rollers 12 and 11. The paper consists essentially of cellulose $[C_6H_{10}O_5)x]$ and water. It is carried from rollers 11 and 12 to a surveying apparatus indicated generally as 14, which comprises a source of beta radiation 16 and a source of neutrons 17. Source 16 preferably comprises a mass of $Sr^{90}$ 18, having an activity of say 100 mc. encased in suitable shielding material such as lead 20. Source 17 preferably comprises Ra—Be having an activity of say 100 to 500 mc. suitably shielded by lead and paraffin as at 24.

The exact amount of radioactive source material employed will depend on the area which it is desired to irradiate. The area in turn will vary with the material and the process. With a web of paper as shown in the drawing, it will usually be sufficient to irradiate a small strip near the edge of the material, say about 0.001 inch wide. The source is preferably moved as close to the material as possible, barring actual contact. Instead of irradiating a continuous strip of the web, the surveying apparatus may be scanned back and forth across the web by any suitable mechanism (not shown).

Beta particles from source 16 impinge upon and penetrate web 10 as at 26a. A certain proportion of them are absorbed, the proportion absorbed depending on the velocity of the particles, and the density and thickness of the web. The beta particles which penetrate the web 10 are picked up by scintillation counter 26 and converted to a voltage which is proportional to the number of beta particles passing through the web. This voltage is transmitted to a computer 28 by lines 30 and 32.

Neutrons from source 17 impinge upon and penetrate the web 10 as at 19. A certain number of them collide with hydrogen atoms, in the course of which the hydrogen nucleus is speeded up, and losing its electron, becomes a proton.

The protons are picked up by a scintillation counter 21 and converted to a voltage proportional to the quantity of protons received and hence to the amount of hydrogen in the web. This voltage is sent to the computer 28 through lines 23 and 25.

As pointed out, details of construction of the computer are not a part of the present invention. However, for the sake of illustration, a schematic wiring diagram of one possible type of computer is shown in Fig. 2. The computer is arranged to solve the equation:

(1)
$$x = \frac{k_2 - k_1 k_3}{\frac{k_1}{9} - k_1 k_3}$$

referred to above.

Referring to Fig. 2, a direct current voltage $V_o$ which is representative of the quantity of beta particles detected by counter 26 is introduced at 34. A standard voltage $V_s$ determined by measuring the voltage developed in counter 26 when no web intervenes between the counter and source 16, is applied at 36. The difference between these voltages $V_s - V_o = V_1$, is representative of the attenuation of the beta stream and hence of the mass/unit area of web 10.

Voltage $V_1$ is converted to alternating current at 38, passed through calibrating transformer 80, multiplied ($k_3$) times in transformer 40 and rectified at 42 to give a voltage at 43 representative of $k_3 V_1$.

A direct current voltage $V_2$ derived from the scintillation counter 21 is representative of the number of recoil protons produced in web 10 by neutrons from source 17 and hence of the hydrogen content $k_2$ of the web. It is introduced at 44. The voltage $k_3V_1$ at point 43 is then subtracted from the voltage $V_2$ to give a voltage at 46 of $V_2-k_3V_1$ representative of $k_2-k_1k_3$, or the numerator of the expression set forth above.

The voltage $V_1$ after conversion to A.C. at 38 and after passing through calibrating transformer 80 is also impressed on the primary coil of transformer 48 and in that transformer is reduced to ⅑ its value and then rectified at 50 to give a voltage of $$\frac{V_1}{9}$$

at 52.

A potential of $k_3V_1$ is taken off the secondary of transformer 40 and after rectification at 54 is subtracted from $$\frac{k_1}{9}$$

to give a voltage at 56 of $$\left(\frac{V_1}{9} - V_1k_3\right)$$

which is representative of $$\left(\frac{k_1}{9} - k_1k_3\right)$$

the denominator of the above expression.

After suitable multiplication and amplification at 58 the potential 56 is used to drive an electric motor 60 at a speed proportional to the voltage at 56. The motor 60 in turn drives a pump 62, which is connected to a cylinder 64, in an hydraulic circuit which also includes a valve 61 and a reservoir 63. Cylinder 64 is fitted with a piston 66 and a spring 68 which normally biases the piston 66 at a position toward the upper end of the cylinder.

Piston 66 has a rod 70 which operates a slide 75 on a rheostat 72. The rheostat 72 is a part of a circuit indicated generally as 77, which also includes an ammeter 74, and upon which is impressed the voltage 46 (proportional to $k_2-k_1k_3$). Rheostat 72 is wound so that its resistance increases with the square root of the distance from initial point 78. Hence, the total resistance inserted in circuit 77 is proportional to the square root of the distance slide 75 has moved along rheostat 72.

The pressure in cylinder 64 is proportional to the square of the speed of pump 72 which in turn is proportional to the voltage at 56

$$\left(\frac{k_1}{9} - k_1k_3\right)$$

The position of the piston 66 in cylinder 64, and hence the position of the slide 15 on rheostat 72 are therefore proportional to the square of the voltage 56. Resistance introduced into circuit 77 is, however, proportional to the square root of the distance which the slide 75 has moved along rheostat 72, and hence directly proportional to the first power of the voltage at 56.

The current in circuit 77 as measured on ammeter 74 is $$\frac{E}{R}$$

E is proportional to $$k_2-k_1k_3 \text{ and } R \text{ to } \left(\frac{k_1}{9} - k_1k_3\right)$$

Thus the current is proportional to $$x = \frac{k_2-k_1k_3}{\frac{k_1}{9} - k_1k_3}$$

and the reading on ammeter 74 provides a continuous indication of the moisture content of web 10.

Rheostat 82 is provided for calibration purposes.

In many cases it is desired to have a more compact computer than that shown in Fig. 2 and an electronic device may be employed.

Figure 4:
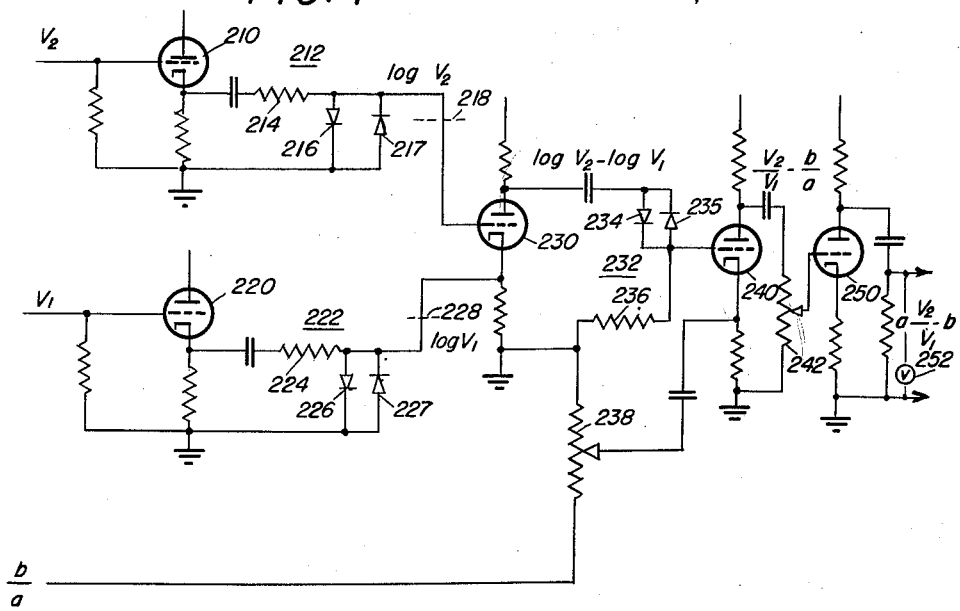
Fig. 4 is a schematic wiring diagram of the preferred computing machine of Fig. 3.

One such device is shown in Figs. 3 and 4. This device is set up to solve Equation 2 above, $$x = a\frac{k_2}{k_1} - b$$

When using the computer shown in Figs. 3 and 4, the output current from radiacs 21 and 26 fed to the computer should have a frequency of the order of 1000 c.p.s. Such currents may easily be obtained by means well known to the art which are not a part of this invention.

Referring to the block diagram of Fig. 3, the voltage from radiac 26 may be made proportional to the total mass per unit area $k_1$ of the web 10, as for example by the means described in connection with Fig. 2 above, and this is designated $V_1$ on Figs. 3 and 4. The voltage from radiac 21 is proportional to the total hydrogen content $k_2$ of the web and is designated $V_2$ on Fig. 3. The voltages $V_1$ and $V_2$ are fed into log computers 110 and 112 respectively and the resulting voltages, equal to log $V_1$ and log $V_2$ are fed to a subtractor 114 to give a voltage equal to (log $k_2$ - log $k_1$). The voltage (log $k_2$ - log $k_1$) is in turn fed to an anti-log computer 116, where it is transformed to $$\frac{k_2}{k_1}$$

The voltage $V_2/V_1$ is then fed to a subtractor 118, to which is also fed a voltage proportional to $b/a$. The difference $$\left(\frac{V_2}{V_1} - \frac{b}{a}\right)$$

is taken off subtractor 118 and delivered to a calibrator 120 where it is multiplied by $(a)$ to give a voltage proportional to $$x = \left[a\frac{k_2}{k_1} - b\right]$$

A suitable circuit corresponding to the block diagram of Fig. 3 is shown in Fig. 4.

Referring to Fig. 4, the voltage $V_2$, proportional to the hydrogen content $k_2$ of the web is fed to the grid of a triode 210. The output from the triode 210 is fed to a voltage divider designated generally as 212 and comprising a resistor 214 and a set of two diodes 216 and 217. These diodes are of the "varistor" type made by the International Resistance Co. They are characterized in that their forward resistance is high and is a function of the impressed voltage. When such diodes are used in a voltage divider of the type described, an output voltage equal to the logarithm of the input voltage is obtained. Thus the voltage at point 218 in Fig. 4 is log $V_2$.

Similarly the voltage $V_1$ proportional to the total mass per unit area $k_1$, is fed to the grid of a triode 220 and the output from that tube is fed to a voltage divider 222 comprising a resistor 224 and "varistors" 226 and 227 to give a voltage at 228 equal to log $V_2$.

The output from voltage divider 212, log $V_2$, is fed to the grid of a triode 230, and the output from voltage divider 222, log $k_1$, is fed to the cathode of triode 230. The output from triode 230 is thus equal to log $k_2$ - log $k_1$. This voltage is then impressed on a voltage divider 232 comprising "varistors" 234 and 235 and resistor 236.

It will be observed that in voltage divider 232 the input is fed to the "varistors" 234 and 235 and the resistor 236 is connected to ground, this arrangement being the reverse of voltage dividers 212 and 222. Thus the output from the voltage divider 232 is the antilog of the input or $$\frac{V_2}{V_1}$$

This voltage is fed to the grid of a triode 240.

A constant voltage $$\frac{b}{a}$$

at a frequency equal to the frequency of $V_2$ and $V_1$ is fed to the cathode of a triode 240 through a variable calibrating resistor 238. The output from triode 240 is thus $$\frac{V_2}{V_1}\frac{b}{a}$$

and is fed through calibrating variable resistor 242 to the grid of another triode 250 where it is multiplied in conventional fashion ($a$) times to give an output proportional to $$x = a\frac{k_2}{k_1} - b.$$

A suitable voltmeter 252 is used to indicate this voltage which is thus a direct and continuous indication of the water content of web 10.

It will be understood that the specific embodiment described is given for purposes of illustration only, and is not to be taken as limiting the invention beyond the scope of the appended claims.

What I claim is:

1. A method for measuring the moisture content of a material which comprises in combination the steps of measuring the mass per unit area of said material and passing the measured data into a calculating machine, subjecting said material to fast neutron radiation, measuring the quantity of protons produced by said neutron radiation on a side of the material opposite that which is subjected to fast neutron radiation as representative of the quantity of hydrogen in said material, and feeding this data into the above mentioned calculating machine whereby the moisture content of said material can be determined.

2. A method for measuring the moisture content of material moving on a conveyor which comprises subjecting said moving material to ionizing radiation and measuring the attenuation of said radiation in passing through said material as representative of the mass per unit area of said material, simultaneously subjecting said material to a beam of fast neutrons and measuring the quantity of protons produced by collision of said fast neutrons with hydrogen atoms, as representative of the hydrogen content of said material, whereby the moisture content of said material can be determined.

3. Apparatus for determining the moisture content of material comprising means for measuring the mass per unit area of said material in combination with means for subjecting said material to a beam of fast neutrons, means for passing said material through said stream of fast neutrons, and radiac means for measuring the recoil protons produced by the effect of said fast neutron radiation on said material.

4. Apparatus as claimed in claim 3, and including computer means connecting with said means for measuring mass/unit area and said radiac means for computing the moisture content of said material.

5. Apparatus for determining the moisture content of a web of material comprising means for measuring the mass per unit area of said web in combination with a source of fast neutron radiation, means for passing said web through said fast neutron radiation, and radiac means for measuring protons produced by the action of said fast neutrons on said web.

6. Apparatus as claimed in claim 5, and including computer means connecting with said means for measuring mass per unit area and said radiac means for computing the moisture content of said material.

7. In an apparatus for determining the moisture content of a web of material, a source of neutrons, a radiac instrument adapted to measure proton radiation and means for passing said web between said neutron source and said instrument, whereby the recoil protons resulting from the neutron bombardment of said web may be measured as indicative of the hydrogen content of said web.

8. Apparatus for determining the moisture content of material, comprising means for subjecting said material to a first stream of ionizing radiation, first radiac means arranged to measure the amount of radiation absorbed from said first stream by said material, means for directing a stream of fast neutrons on said material on one side thereof, and second radiac means on the other side of said material for detecting proton radiation arising from the action of said neutrons on said material.

9. Apparatus as claimed in claim 8, and including in combination therewith, computer means connected to said first and second radiac means for computing the moisture content of said material.

10. Apparatus for determining the moisture content of a web of material comprising a first source of ionizing radiations, first radiac means positioned to receive radiation from said first source, a second source of radiation, the radiation from said second source comprising neutrons, second radiac means for detecting protons caused by the action of neutrons from said second source on hydrogen atoms, and means for moving the web between said first source and said first radiac means and between said second source and said second radiac means, whereby said first radiac means indicates the attenuation of ionizing radiation from said first source by said web as representative of the mass per unit area of said web and said second radiac means indicates the quantity of protons produced from said web as representative of the hydrogen content of said web, per unit area.

11. Apparatus as claimed in claim 10, and including computing means and means for conveying data from the first and second radiac means to said computer means whereby the moisture content of said web can be calculated.

12. Apparatus for determining the moisture content of a continuously moving stream of hydrogen containing material, comprising means for subjecting said material to a first stream of ionizing radiation, first radiac means arranged to measure the amount of radiation absorbed from said first stream by said material, means for directing a stream of fast neutrons on said material, and second radiac means for detecting proton radiation arising from the action of said neutrons on said material.

References Cited in the file of this patent

UNITED STATES PATENTS

| 2,264,725 | Shoupp et al. | Dec. 2, 1941 |
| 2,602,751 | Robinson | July 8, 1952 |
| 2,616,052 | Hurst | Oct. 28, 1952 |
| 2,648,012 | Scherbatskoy | Aug. 4, 1953 |
| 2,681,416 | Thompson | June 15, 1954 |
| 2,750,144 | Beckwith | June 12, 1956 |
| 2,761,977 | McKay | Sept. 4, 1956 |

FOREIGN PATENTS

| 684,503 | Great Britain | Apr. 5, 1951 |

UNITED STATES PATENT OFFICE
CERTIFICATE OF CORRECTION

Patent No. 2,920,206            January 5, 1960

John Herbert Heller

It is hereby certified that error appears in the printed specification of the above numbered patent requiring correction and that the said Letters Patent should read as corrected below.

Column 3, lines 61 to 63, equation (2) should appear as shown below instead of as in the patent:

$$x = a\frac{k_2}{k_1} - b$$

column 4, line 42, for "Neutrone" read -- Neutrons --.

Signed and sealed this 22nd day of November 1960.

(SEAL)
Attest:

KARL H. AXLINE
Attesting Officer

ROBERT C. WATSON
Commissioner of Patents